United States Patent
Bates et al.

(12)

(10) Patent No.: US 6,970,541 B2
(45) Date of Patent: Nov. 29, 2005

(54) TELECOMMUNICATION SERVICE PROCESSING METHOD AND APPARATUS

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 09/920,611

(22) Filed: Aug. 1, 2001

(65) Prior Publication Data

US 2003/0026401 A1  Feb. 6, 2003

(51) Int. Cl.[7] ............................................ H04M 15/00
(52) U.S. Cl. .............................. 379/114.15; 379/216.01
(58) Field of Search ........................ 379/114.15, 114.2, 379/114.18, 114.19, 144.01, 216.01, 355.01, 379/355.04, 355.05, 355.09, 355.1, 201.01, 379/201.02; 455/405, 406, 414.1, 564

(56) References Cited

U.S. PATENT DOCUMENTS

| | | | | |
|---|---|---|---|---|
| 5,754,636 A | * | 5/1998 | Bayless et al. | 379/142.1 |
| 5,983,093 A | * | 11/1999 | Haimi-Cohen | 455/411 |
| 6,038,292 A | * | 3/2000 | Thomas | 379/88.06 |
| 6,246,757 B1 | * | 6/2001 | Cai et al. | 379/114.2 |
| 6,757,376 B1 | * | 6/2004 | Yoon | 379/355.01 |
| 2001/0038689 A1 | * | 11/2001 | Liljestrand et al. | 379/201.03 |

* cited by examiner

Primary Examiner—Curtis Kuntz
Assistant Examiner—Barry W. Taylor
(74) Attorney, Agent, or Firm—Moser, Patterson & Sheridan, LLP

(57) ABSTRACT

Embodiments provide a method, article of manufacture, and apparatus for telecommunication service processing. In one embodiment, a calling card may be customized to redial a last number by entering a pre-defined shortcut sequence. In another embodiment, a search tool is used to search for a particular number using one or more pre-stored address books.

12 Claims, 5 Drawing Sheets

CHARACTER CONFIGURATION DATA – 220

| | 502 | 504 | 506 | 508 |
|---|---|---|---|---|
| 510 | FUNCTION | OPTION1 | OPTION2 | OPTIONnth |
| 512 | LAST NUM | # | #N | ... |
| 514 | SET LANGUAGE | LE=ENGLISH | LS=SPANISH | ... |
| 516 | ADDRESS BK | A1= ADRS BK 1 | A2= ADRS BK 2 | ... |
| 518 | CALANDER | C | CL | ... |
| 520 | REDIAL | LAST FOUR | LAST FIVE | ... |
| 522 | SET PREFS | * | ** | ... |
| 524 | SET SECURITY | P | P1 | ... |
| 526 | LIST LAST NUM | L | LN | ... |
| 528 | NEW DIALTONE | * | ** | ... |
| 530 | ADD/SUB ADRS BK | + | - | ... |
| 532 | ADRS BK SEARCH | 0 | S | ... |
| | ... | ... | ... | ... |

FIG. 3   USER DATA – 210

| 302 | 304 |
|---|---|
| CURRENT USER | USER1 |
| PIN NUMBER | 123456 |
| NAME | NAME INFO |
| ADDRESS | ADDRESS INFO |
| CITY | CITY INFO |
| STATE | STATE INFO |
| COUNTRY | COUNTRY INFO |
| ... | ... |

308 PIN NUMBER
310 NAME
312 ADDRESS
314 CITY
316 STATE
318 COUNTRY
320 ...

FIG. 4   PREFERENCES DATA – 215

| PREFERENCES | USER1 PREFS | USER2 PREFS | USER PREFSnth |
|---|---|---|---|
| | | | ... |
| LAST NUM | # | #N | ... |
| LANGUAGE | ENGLISH | SPANISH | ... |
| ADDRESS BOOK | A1 | A2 | ... |
| CALANDER | C | CL | ... |
| REDIAL | LAST FOUR | LAST SIX | ... |
| SET PREFS | * | ** | ... |
| SET SECURITY | P | P1 | ... |
| LAST NUM DEF | L | LN | ... |
| NEW DIALTONE | * | ** | ... |
| ADD/SUB ADRS BK | +/- | +/- | ... |
| ADDRES SEARCH | 0 | S | ... |
| ... | ... | ... | ... |

402, 404, 406, 408
410, 412, 414, 416, 418, 420, 422, 424, 426, 428, 430, 432

FIG. 5  CHARACTER CONFIGURATION DATA – 220

| | 502 | 504 | 506 | 508 |
|---|---|---|---|---|
| 510 | FUNCTION | OPTION1 | OPTION2 | OPTIONnth |
| 512 | LAST NUM | # | #N | ... |
| 514 | SET LANGUAGE | LE=ENGLISH | LS=SPANISH | ... |
| 516 | ADDRESS BK | A1= ADRS BK 1 | A2= ADRS BK 2 | ... |
| 518 | CALANDER | C | CL | ... |
| 520 | REDIAL | LAST FOUR | LAST FIVE | ... |
| 522 | SET PREFS | * | ** | ... |
| 524 | SET SECURITY | P | P1 | ... |
| 526 | LIST LAST NUM | L | LN | ... |
| 528 | NEW DIALTONE | * | ** | ... |
| 530 | ADD/SUB ADRS BK | + | - | ... |
| 532 | ADRS BK SEARCH | 0 | S | ... |
| | ... | ... | ... | ... |

FIG. 6  NUMBERS DIALED – 225

| | 602 | 604 | 606 | 608 |
|---|---|---|---|---|
| 610 | NUMBERS DIALED | USER1 | USER2 | USERnth |
| 612 | NUMBER 1 | 1234567890 | 2345678901 | ... |
| 614 | NUMBER 2 | 1232345678 | 2345678911 | ... |
| | ... | ... | ... | ... |

FIG. 7  ADDRESS BOOKS – 230

| | 702 | 704 | 706 | 708 |
|---|---|---|---|---|
| 710 | ADDRESS BOOK | USER1 | USER2 | USERnth |
| 712 | RECORD | 1 | 1 | ... |
| 714 | NAME | CONT NAME INFO | CONT NAME INFO | ... |
| 716 | ADDRESS | CONT ADRS INFO | CONT ADRS INFO | ... |
| 718 | CITY | CONT CITY INFO | CONT CITY INFO | ... |
| 720 | STATE | CONT STATE INFO | CONT STATE INFO | ... |
| 722 | COUNTRY | CONT COUNTRY | CONT COUNTRY | ... |
| | ... | ... | ... | ... |

TELECOMMUNICATION SERVICE PROCESSING METHOD AND APPARATUS

BACKGROUND OF THE INVENTION

1. Field of the Invention

Embodiments of the invention generally relate to telephony. More particularly, the invention relates to telephone calling cards.

2. Background of the Related Art

Generally, telephone calling cards are designed to allow the user to make telephone calls from virtually any telephone. Conventional telephone calling cards can be pre-paid or on a billed calling plan that facilitates telephone communications from virtually anywhere in the world from one communication system to another such as a telephone. One example of a pre-paid calling card plan is a "pre-paid" calling card where the amount of minutes used is deducted from the total amount of available paid for minutes. Additionally, as telephone calling cards have become popular worldwide, many countries use the card for convenience calling within the country and to other countries around the world.

Unfortunately, to use a calling card generally requires the user to enter an inordinate amount of information for each call, making it difficult to dial a telephone number expediently. Furthermore, conventional telephone calling cards with menus are usually pre-set thereby causing the user to go through unnecessary menus to use the card, and may waste the user's time by having them listen to each menu. As a result, calling card systems have been developed that help the user to facilitate a call by allowing the user to use common telephone keypad buttons to speed up the call. Two common telephone keypad buttons used are the pound (#) key and the asterisk (*) key. Some common functions used by calling cards are the "next call" selection allowing the user to make another call without redialing the main calling card number or to dial a number within a list of numbers previously dialed during the call, and language selection for voice prompts. Unfortunately, once the call is complete and the user disconnects from the calling card system all of the previously user specific calls and settings are lost. Thus, to use specific calling card features and/or call previously dialed numbers again requires the user to manually reenter the access code numbers, features, and/or the numbers to redial each time the card is used.

Therefore, there is a need for a telephone calling card that is easy to use and facilitates telephone calls in an efficient and cost effective manner.

SUMMARY OF THE INVENTION

Embodiments provide a method, article of manufacture, and apparatus for customizing telephone calling card features, options, and configurations to facilitate a user in making a telephone call. In one embodiment, the invention provides a method of processing a telephone call at a communication processing system, wherein the telephone call is made from a telecommunications device by a user using a telephone calling card. The method comprises processing an identification number associated with the telephone calling card, receiving a command from the telecommunications device, in response to the command, configuring a calling card function, and storing the calling card function in a user-preferences data structure for use during a subsequent network connection between the user and the communication processing system.

In another embodiment the invention provides a method of processing a telephone call at a communication processing system, wherein the telephone call is made from a telecommunications device by a user using a telephone calling card. The method comprises, during a connection with the telecommunications device, processing an identification number received from the telephone calling card, enabling at least one user-defined calling card function using the identification number, receiving, from the telecommunications device, a command configured to invoke the at least one user-defined calling card function, and executing the at least one user-defined calling card function.

In another embodiment, the invention provides a computer-readable medium containing a telephone calling card program, wherein the calling card program, when executed by a processor performs operations in response to accepting a telephone call from a user of a calling card. The operations comprise processing an identification number associated with the telephone calling card, receiving a command from the telecommunications device, in response to the command, configuring a calling card function, and storing the calling card function in a user-preferences data structure for use during a subsequent telephone call initiated by the user of the calling card. In another embodiment, the operations comprise processing an identification number received from the telephone calling card, enabling at least one user-defined calling card function using the identification number, receiving, from the telecommunications device, a command configured to invoke the at least one user-defined calling card function, and executing the at least one user-defined calling card function.

BRIEF DESCRIPTION OF THE DRAWINGS

So that the manner in which the above recited features and embodiments can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 illustrates several data structures related to the user identity data in which aspects of the invention may be used to advantage.

FIG. 4 illustrates several data structures related to user preference data in which aspects of the invention may be used to advantage.

FIG. 5 illustrates several data structures related to character configuration data in which aspects of the invention may be used to advantage.

FIG. 6 illustrates several data structures related to the numbers dialed data in which aspects of the invention may be used to advantage.

FIG. 7 illustrates several data structures related to an address book data in which aspects of the invention may be used to advantage.

DETAILED DESCRIPTION OF THE PREFERRED EMBODIMENTS

Embodiments provide a method, article of manufacture, and apparatus for customizing telephone calling card features, options, and configurations to facilitate a user in making a telephone call. As used herein "configuration" includes any configuration data or values regardless of format, or length. A value may be a single character (e.g., letter, numeral, symbol, etc.) or may be a string of characters (e.g., a phrase). As used herein "pre-defined configuration" means that a fixed/static association between configuration data/values exist. In particular, "pre-defined," indicates that the association exists before executing a telephone calling card operational sequence.

As will be described below, aspects of one embodiment pertain to specific method steps implementable on computer systems. In one embodiment, the invention may be implemented as a computer program-product for use with a computer system. The programs defining the functions of at least one embodiment can be provided to a computer via a variety of computer-readable media (i.e., signal-bearing medium), which include but are not limited to, (i) information permanently stored on non-writable storage media (e.g. read-only memory devices within a computer such as read only CD-ROM disks readable by a CD-ROM or DVD drive; (ii) alterable information stored on a writable storage media (e.g. floppy disks within diskette drive or hard-disk drive); or (iii) information conveyed to a computer by communications medium, such as through a computer or telephone network, including wireless communication. The latter specifically includes information conveyed via the Internet. Such signal-bearing media, when carrying computer-readable instructions that direct the functions of the invention, represent alternative embodiments of the invention. It may also be noted that portions of the product program may be developed and implemented independently, but when combined together are embodiments of the invention.

Figure 1:
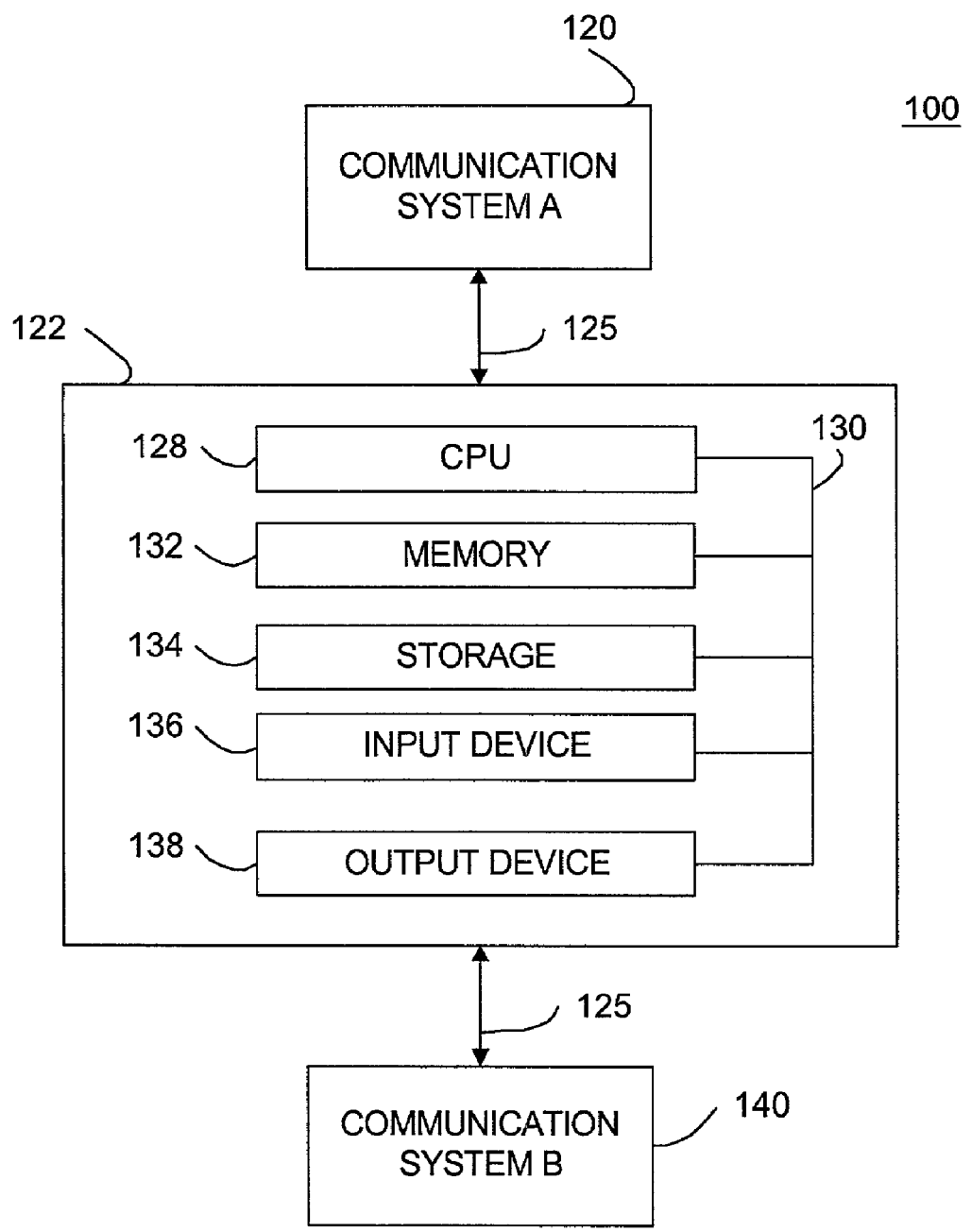
FIG. 1 depicts a data processing system in which one embodiment may be implemented.

FIG. 1 depicts one embodiment of a data processing system 100. In general, the data processing system 100 includes a telephone call processing system 122 adapted to connect (via a network connection facility) at least one communication connection system A 120 to another communication system B 140. The communication systems 120, 140 represent communication devices such as telephones, cellular phones, radios, and the like adapted to provide two-way communication. The communication systems 120–140, are coupled to the telephone call processing system 122 via a transmission connection 125 such as telephone wires, cables, twisted pair, and others, including wireless connections, adapted to provide a two-way communication connection. Illustratively, the telephone call processing system 122 includes a Central Processing Unit (CPU) 128 connected via a bus 130 to a memory 132, storage 134, input device 136, and output device 138. The input device 136 can be any device to give input to the telephone call processing system 122. For example, a keyboard, keypad, light-pen, touch-screen, track-ball, or speech recognition unit could be used. The output device 138 is preferably any conventional display screen and, although shown separately from the input device 136, the output device 138 and input device 136 could be combined. For example, a display screen with an integrated touch-screen, and a display with an integrated keyboard, or a speech recognition unit combined with a text speech converter could be used. Storage 134 is preferably a direct access storage device (DASD), although it is shown as a single unit, it could be a combination of fixed and/or removable storage devices, such as fixed disc drives, floppy disc drives, tape drives, removable memory cards, or optical storage. Memory 132 and storage 134 could be part of one virtual address space spanning multiple primary and secondary storage devices. Memory 132 is preferably random access memory sufficiently large to hold the necessary programming and data structures located on the telephone call processing system 122. While memory 132 is shown as a single entity, it should be understood that memory 132 may in fact comprise a plurality of modules, and that memory 132 may exist at multiple levels, from high speed registers and caches to lower speed but larger DRAM chips.

FIG. 1 is merely one configuration for data processing system 100. Embodiments of the invention can apply to any comparable configuration, regardless of whether the data processing system is a complicated multi-user apparatus, a single-user workstation, or network appliance that does not have non-volatile storage of its own.

Figure 2:
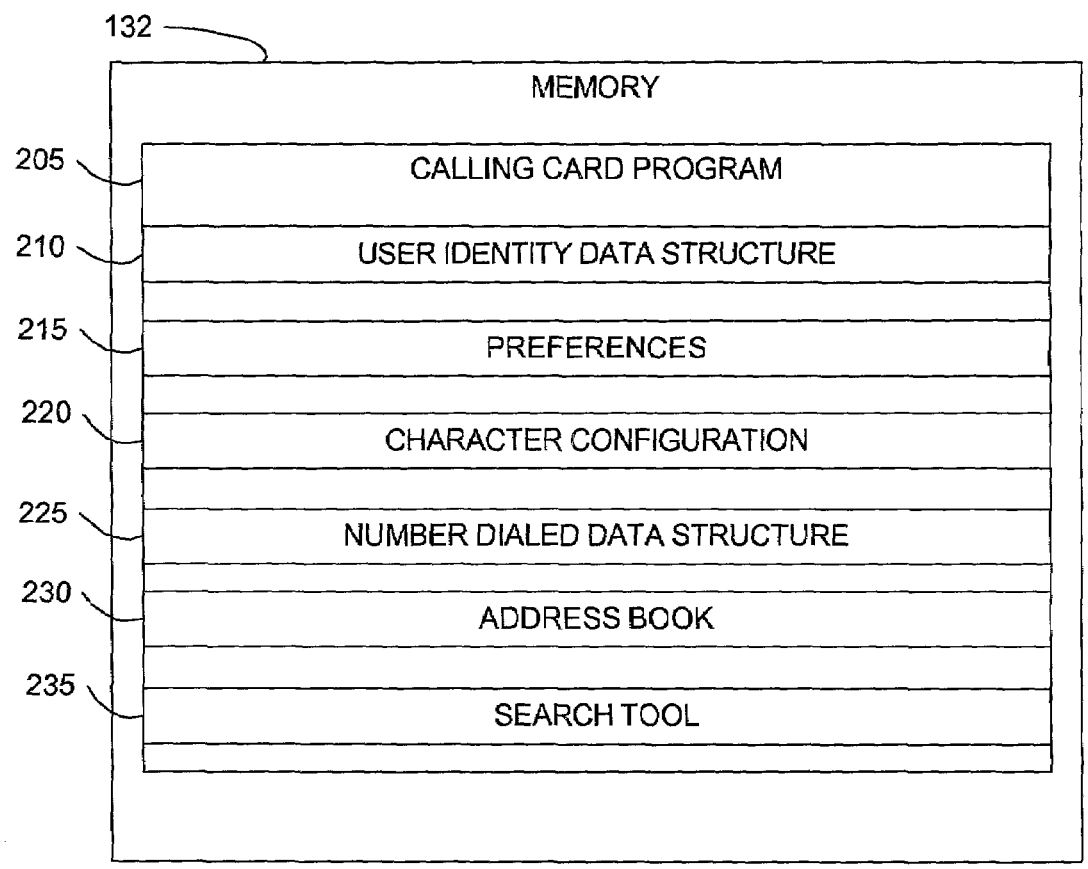
FIG. 2 depicts a memory core for storing programming data in which aspects of the invention may be used to advantage.

FIG. 2 depicts one embodiment of the memory 132 for storing programming and data. FIG. 1 is referenced within the following discussion of FIG. 2 as is necessary.

Memory 132 includes various data structures used to facilitate the operation and configuration of a telephone calling card. In one embodiment, memory 132 is shown containing a calling card program 205 adapted to receive and process external commands from a user to facilitate the use of the calling card. The calling card program 205 implements functions that are accessible to the user using predefined commands. The predefined commands may be configured and executed using characters and phrases entered such as alpha-numeric characters, phrases, voice commands, and the like. In one aspect, the functions are activated by characters and phrases in macro i.e., shortcut form, to expedite the function activation. A macro character, or phrase, is defined herein as one or more characters used to activate one or more functions.

Illustrative dialing functions of the calling card program 205 include, last number redial (to allow the user the ability to dial the previous number dialed), name entry dialing (to allow the user to dial a number having an associated name), and dialing a stored number by entering one or more digits (less than all digits of the stored number) corresponding to the number stored. Other functions of the calling card program include accessing an address book, setting language preference, voice prompts, and others. The calling card program also is configured with functions as known in the art such as, establishing a new dial tone, and the like.

The memory 132 also includes a plurality of data structures which are used by the calling card program 205. A user identity data structure 210 and a user preferences data structure 215 allow the telephone calling card program to associate the calling card configuration with regard to one or more users. In one embodiment, the memory 132 includes a character configuration data structure 220 to associate characters such as the pound (#), asterisk (*), and the like, with particular functions of the calling card program 205. In addition, memory 132 includes a number dialed data structure 225 to store numbers previously dialed, and an address book 230 to store the names and phone numbers of recently dialed numbers and other address data such as name, address, and the like. In one embodiment, the address book is configured by the user to store the number and/or name of the entity called, and/or a predefined database such as a telephone book, personal digital assistant (PDA), and the like.

In one embodiment, an address search tool 235 resides within memory 132. When executed on CPU 128 in response to receipt of a name search query, the address search tool 235 searches the address book data structure 230 for information pertaining to the query. In one aspect, the search tool 235 searches for a name within the address book 230 using one or more digits of a telephone number. In another aspect, the search tool searches for a telephone number using one or more characters as a part of the search query. It is contemplated that the search tool 235 may be configured to only search within the local address book 230 and may be adapted to search other address books and databases stored on a network such as the Internet.

FIGS. 3–7 depict embodiments of the data structures within the memory 132 for storing data such as the telephone calling card configurations in which aspects of the invention may be used to advantage.

FIG. 3 illustrates one embodiment of the user profile data structure 210. User-specific data entered for a user profile is stored in the user profile data structure 210. Each row 308–320 of the user profile data structure 210 defines elements of a user record. Illustratively, the user profile data structure 210 includes a user information definition column 302 including the personal identification number (PIN) 308, a user name row 310, user address row 312, user city row 314, and the user state row 316, and the user country row 318. The user profile data structure 210 also includes a data column 304 with the current user data corresponding to each entry of the user information definition column 302 for the current user of the telephone calling cards. Although only one data column is shown, it is contemplated that the data structure 210 may include multiple data columns for multiple users.

FIG. 4 illustrates one embodiment of the user preferences data structure 215 and includes telephone calling card preferences specific to one ore more users. FIGS. 1–3 are referenced within the following discussion of FIG. 4 as is necessary.

The user preferences data structure 215 includes user columns 404–408 specific to a particular user, where the USERPREFnth column 408 represents an nth number of users. Configuration data entered with respect to a specific user e.g., user1, user2, etc., is stored in the user preferences data structure 215. Each user column 404–408 of the user preferences data structure 215 is considered one record for one user. The user preferences data structure 215 includes a preference header column 402 that includes preferences definitions for each row 412–432. Illustrative preferences include the last number dialed selection character row 412 defining the characters needed to instruct the calling card program 205 to dial the last number, language preference row 414 that instructs the calling card program 205 to speak to the user in their language of choice during a voice prompt, the address book access character(s) which instructs the calling card program 205 to allow the user to use the address book(s) 230, and others. Within the user columns 404–408 are specific preferences corresponding to each user. For example, for the user1 column 404, the preferences stored in each row 412–432 are preference settings specific to user1. Although, in the illustrated embodiment preferences in each row 410–432 relate to specific user, other embodiments are contemplated whereby a user column 404–408 can relate to more than one user using the same configuration such as a group, company, organization, and the like. Further, although preference rows 410–432 define one embodiment of a set of user preferences, it is contemplated that any number of preferences may be provided to facilitate the configuration an operation of the telephone calling card.

FIG. 5 illustrates one embodiment of the character configuration data structure 220 and includes one or more characters specific to operations of the calling card program 205. FIGS. 1–4 are referenced within the following discussion of FIG. 5 as is necessary.

The character configuration data structure 220 includes option columns 504–508 specific to a particular option associating one or more characters entered to a particular function, where the OPTIONnth column 508 represents an nth number of options available for each function of the calling card program 205. Configuration data entered with respect to a specific option e.g., option1, option2, etc., is stored in the character configuration data structure 220. The character configuration data structure 220 includes an option header column 502 that includes function associations for each row 512–532. Functions include last number dialed 512 defining the characters needed to instruct the calling card program 205 to dial the last number, language preference function 514 that instructs the calling card program 205 to speak to the user in their language of choice, and the address book access character(s) which instructs the calling card program 205 to allow the user to use the address book(s) 230. Other functions include but are not limited to, a calendar function 518, a redial function 520, and a set preference function 522 to allow the user to set their preferences. Additional functions include, a set security function to allow the user to password protect their preferences 215, address book 230, and the like, a last number(s) dialed list, a new dial tone 528 so the user can make a new call without redialing the access number of the calling card. In one embodiment, the character configuration data structure 220 contains characters that allow functions 530 such as adding or subtracting to the user address book 230. For example, the user can combine their address book with another address book such as an address book from another user, personal digital assistant (PDA), or the like. In still another embodiment, the character configuration data structure 220 includes a character configuration to activate an address search function 532 using the search tool 235. Within the option columns 504–508 are specific preferences associated with each option. For example, for the option1 in column 504, the last number dialed option from row 512 is the pound sign (#) indicating that the # sign when used would redial the last number called by the user. However, in the option2 column 506 the last number redial sequence is the # plus the N character together i.e., #N, to redial the last telephone number dialed. Although option rows 510–532 define one embodiment of a set of functions, it is contemplated that any number of functions may be provided to facilitate the access to functions of the calling card program 205.

FIG. 6 illustrates one embodiment of the number dialed data structure 225 and includes on or more numbers dialed by a one or more users. FIGS. 1–5 are referenced within the following discussion of FIG. 6 as is necessary.

The numbers dialed data structure 225 includes columns 604–608 associating one or more numbers dialed to a particular user. The USERnth column 608 represents an nth number of users having associated lists of dialed telephone numbers. Each row 612–614 represents a number dialed record for each user. For example, the first user column 604 has a first number dialed row 612, and a second number dialed row 614, and so on. Although only a few numbers dialed are illustrated, it is contemplated that any number of dialed number records may be associated with one or more users.

FIG. 7 illustrates one embodiment of the address book structure 230 and includes on or more addresses associated with one or more users. FIGS. 1–6 are referenced within the following discussion of FIG. 7 as is necessary.

The address book structure 230 includes user address book record columns 702–708. A first column defines a plurality of data categories, such as address book data categories, for a particular user. Illustrative categories in rows 710–722 include a record value, a name, an address, a city, a state, a country, etc., respectively. The remaining columns 704–708 define records for other users. The USERnth column 708 represents an nth number of users. Therefore, each column 704–708 defines a data record list defining an address book specific for each user. It is contemplated that any number of records may be associated with a particular user and that one or more address books may be merged or combined to form a larger address book.

Figure 8:
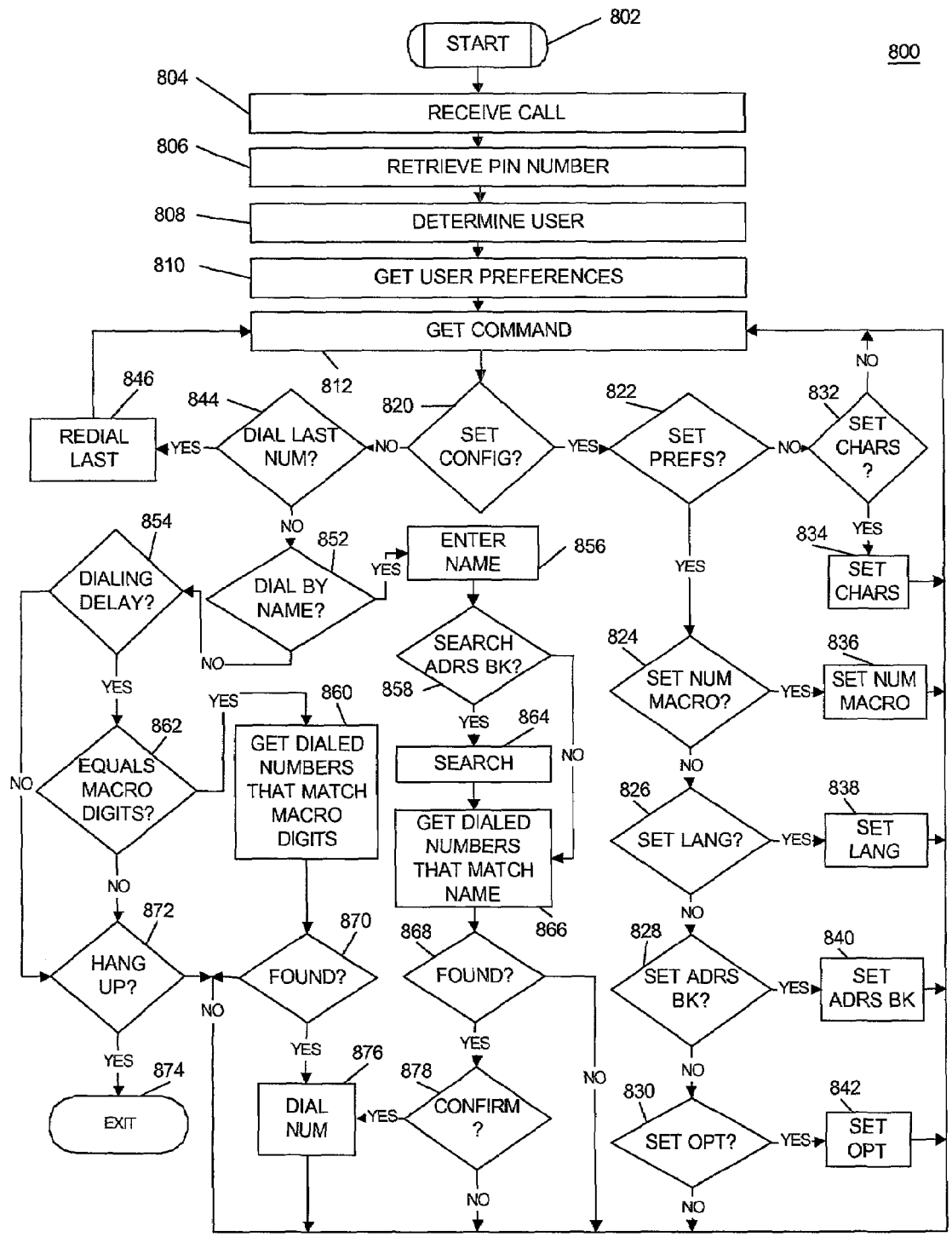
FIG. 8 is a flow diagram of a method for establishing a calling card sequence for the accordance with aspects of the invention.

FIG. 8 depicts a flow diagram of a method 800 for activating a telephone calling card configuration and operation. The particular steps and sequence of steps are merely illustrative and other embodiments are contemplated. As necessary, FIGS. 1–7 are referenced in the following discussion of FIG. 8.

The method 800 of FIG. 8 is entered into at step 802, when for example a user uses a calling card from communication system A 120, to call communication system B 140 and activates the calling card program 205. At step 804, the telephone call processing system 122 receives a telephone call from communication system A 120 via the communication connection 125. At step 806, the method 800 prompts the user for their pin number and subsequently matches the pin number entered to user identity data structure 210 at step 808. In one embodiment, if no match were found then the user would be asked for the pin number again. After a predetermined number of attempts, the user would be given a "no user found" message and the method 800 would disconnect the telephone call processing system 122 from the communication system A 120. At step 810, the user preferences from the preferences data structure 215 are retrieved and the preferences are stored in memory 132 for the duration of the call.

At step 812, the method 800 gets a command from the communication system A 120. If the command is to set the configuration of the calling card program 205, then the method 800 proceeds to step 822. If the command is not to set the configuration of the calling card program 205, then the method 800 proceeds to step 844 described below. If the command is to set the calling card configuration, at step 822, the method determines if the command is to set the preferences of the calling card program 205 for the user, if the command is not to set the preferences, then the method 800 proceeds to step 832. If the command is to set preferences, then the method 800 proceeds to step 824 to determine if the command is to set the redial number macro option of the user preference data structure 215. If the command is to set the number of macro digits used to find a number stored in memory 132, then the method 800 proceeds to step 836 to set the number of digits required to redial a number and subsequently returns to step 812. For example, in one embodiment of step 836, if the user sets the number of digits to redial the number to four, then when a user enters the last four digits of the number to redial, the number is redialed automatically.

If the command was not to set the number of digits to redial a stored number, then the method 800 proceeds to step 826 to determine if the command is related to setting language preferences. If the command is related to setting language preferences then the method 800 proceeds to step 838 to set the language preferences and subsequently returns to step 812. In one embodiment, the language preferences found in character configuration data structure 220 are prompted to the user in each language option to facilitate the setting of the language preferences. For example, if the language options include English, French, and Spanish, a voice prompt would sequentially ask the user in English, French, and Spanish to select their desired language preference, If no selection is made then a default language is set by method 800. If the command is not related to setting language preferences then method 800 proceeds to step 828.

At step 828, the method 800 determines if the command was to set address book preferences. If the command was to set address book preferences, then method 800 proceeds to step 840. At step 840, the user is prompted to select a current address book, or address books, to use. In one embodiment, the user is prompted to enter the address book records from an outside source such as a PDA. In another embodiment, the method 800 prompts the user to enter address information directly using a device keypad, such as a telephone keypad, to enter the data that is then stored in the address book data structure 230. If the command is not to set the address book preferences, then method 800 proceeds to step 830.

At step 830, the method 800 determines if other options need to be set such as the type of calendar. If other options need to be set then method 800 proceeds to step 842 to set the other options available to the user corresponding to the options selected by the user from the character configuration data structure 220.

Returning to step 822, if the command was not to set the user preferences, then the method 800 proceeds to step 832 to determine if the command was to set one or more macro characters (i.e., shortcut characters and/or phrases) used to activate one or more calling card program functions. If the command was not to set the macro characters, the method 800 proceeds to the step 812 to get the next command. If the command is to set the macro characters then the method 800 proceeds to step 832 to associate macro characters with functions of the calling card program 205. For example, the "list last numbers dialed" function row 526 is activated by the macro character "L" for "LIST" in option one, "LN" in option two, and so forth. Further, other macro characters may be set to activate other functions at step 832 such as establishing a new dial tone using the character '*' in one option or '**' in another option, setting security using the characters 'P' in one option or 'P1' in another option, setting preferences, address searching, and the like. While in one aspect macro characters are defined as short-cut characters or phrases that can activate one or more options, any type of character, phrase, and combination or sequence may be used, including voice prompt response where the user responds to a voice prompt question to activate the function.

Returning to step 822, if the command was not to set the calling card program configuration, then the method 800 proceeds to step 844. At step 844, the method 800 determines if the command was to redial the last number dialed. If the command is to redial the last number, the method 800 redials that last number at step 846 and returns to step 812 to get the next command. If the command was not to redial the last number, then method 800 proceeds to step 852. At step 852, the method 800 determines if the command is to dial a number previously dialed using a name value. If the command is to redial a number using the name value, then the method 800 gets the name value from the user at step 856. At step, 858 the method 800 determines if the command included the activation of the address search tool 235 using character keys from the user preference data structure 215. In one embodiment, a command may include one or more commands and data, therefore the command may contain a search command and a name value. For example, user1 depressed the "0" button on a telephone keypad to use the address book search function as part of the command and included a name value. If the search tool 235 has been activated then the search tool 235 proceeds to step 864 and searches for the name value in on or more selected address books from the address book data structure 230 and/or available external databases. Subsequently, at step 866 the method 800 retrieves the relevant numbers associated with the name value. In one embodiment, if an address book search was not evoked at step 858 then at step 864 the address search tool compares and searches the currently dialed number data structure 225 that match the numbers in the address book data structure 230 to find a matching name value at step 866. At step 868, if one or more matching name values were found, then the method 800 prompts the user to select the one or more number values located. If the user does not confirm a selection, then the method 800 returns to step 812. If the user selects a number value, then the method 800 proceeds to step 876 to connect the communication system A to that number and subsequently proceeds to step 812 to get the next command.

If the command was not to dial by name at step 852, the method 800 proceeds to step 854 to determine if the user is using the macro digits (i.e., a shortcut number of digits associated with a previously dialed number) redial function of the calling card program 205. In one aspect at step 854, the method 800 detects a delay in dialing to activate the search tool 235. If the time delay is valid then the method 800 proceeds to step 862 to search for the numbers that match the digits. Although in one embodiment a valid delay is defined as a delay being about greater than or equal to a predetermined delay time of about 2 to 3 seconds, other delay times are contemplated. In another embodiment, it is also contemplated that the delay time may be defined by the user to accommodate different delay time needs. For example, a longer delay time for a user who dials more slowly. If the delay not valid, is less than the time delay allowed, then the method 800 proceeds to step 872 to determine if the truncation of the delay was due to another command character depressed or a disconnection of the communication system A 120 with the telephone call processing system 122. If the telephone call processing system 122 was disconnected, then the method 800 exits at step 874. If the telephone call processing system 122 is not disconnected from the communication system A 120, then the method 800 proceeds to step 812 to get the next command. If the delay time meets or exceeds a valid amount, then the method 800 proceeds to step 860 to get the numbers matching the macro digits. At step 870, if the macro digits are matched to one or more numbers then the method 800 proceeds to step 876 to dial the first matching number. In one embodiment, if more than one number is found at step 870, the method prompts the user to select the number to dial at step 876.

Although various embodiments which incorporate the teachings of the invention have been shown and described in detail herein, those skilled in the art can readily devise many other varied embodiments within the scope of the invention. For example, it is contemplated that the method 800 may connect to more than one communication device by prompting the user to facilitate a conference call option. In another embodiment, the user may set a macro for several simultaneous operations that can be activated by one entry of one or more characters. In still another option, the user may have different configurations related to one identification number. For example, the user may have a configuration suited for personal use and another configuration established for business. Thus, the user can use one calling card to facilitate personal and/or business needs. In addition, some embodiments may allow the user to transfer the configuration information to a new calling card. These embodiments may be particularly desirable because they will encourage users to purchase calling cards associated with the same service provider. Those skilled in the art will appreciate that the present embodiments will provide similar benefits to providers of refillable calling cards.

While the foregoing is directed to the preferred embodiment of the invention, other and further embodiments of the invention may be devised without departing from the basic scope thereof, and the scope thereof is determined by the claims that follow.

What is claimed is:

1. A method for processing a telephone call at a communication processing system, wherein the telephone call is made from a telecommunications device by a user using a telephone calling card, the method, comprising:

(a) performing a configuration operation during a first network connection between the communication processing system and the telecommunications device operated by the user, the configuration operation comprising:

processing a telephone calling card identification number received from the telecommunications device; and receiving a user selection representing a specific number of digits to be entered in order to initiate redialing of a corresponding previously dialed telephone number, wherein the specific number of digits is limited to some number of the last digits of the corresponding previously dialed telephone number, whereby a user-defined calling card redialing function is configured for the calling card identification number; and (b) performing a redialing operation during a second network connection between the communication processing system and the telecommunications device operated by the user, the second network connection being subsequent to the first network connection, the redialing operation comprising:

processing the telephone calling card identification number received from the telecommunications device;

enabling the user-defined calling card redialing function using the identification number;

receiving, from the telecommunications device, one or more user-input digits; and responsive to receiving one or more user-input digits equal to the specific number of digits, executing the at least one user-defined calling card function, wherein executing the at least one user-defined calling card function comprises:

performing a number lookup to determine which one of a plurality of previously dialed numbers corresponds to the one or more user-input digits; and automatically redialing the one corresponding previously dialed number without requiring user input of all digits of the one corresponding previously dialed number.

2. The method of claim 1, wherein the command comprises user input of less than all digits of the number to be redialed.

3. The method of claim 1, wherein the at least one user-defined calling card function further comprises a name lookup function, and further comprising:
receiving another command configured to invoke the lookup function, the command comprising a user name; and
in response to receiving the other command, accessing a directory containing a plurality of telephone numbers and a respective name for each of the plurality of telephone numbers in order to identify a number corresponding to the user name; and
after identifying the number corresponding to the user name, causing the number to be dialed.

4. The method of claim 1, wherein performing the number lookup to determine the one previously dialed number is prompted by an expiration of a predefined delay period initiated after receiving a last digit of the user-input digits.

5. The method of claim 4, wherein the predefined delay period is associated with the telephone calling card and is defined by the user of the telephone calling card.

6. The method of claim 1, wherein redialing one of the plurality of previously dialed numbers stored in the dialed numbers data structure comprises:
receiving, from the telecommunications device, a command containing a user-input number N; and
dialing an Nth previously dialed number stored in the dialed numbers data structure.

7. A communication processing system configured to process a telephone call at the communication processing system, wherein the telephone call is made from a telecommunications device by a user using a telephone calling card, the communication processing system, comprising: a computer comprising a network connection facility to communicate with the telecommunications device, and a processor configured to perform an operation during a network connection with the telecommunications device, the operation comprising:
performing a configuration operation during a first network connection between the communication processing system and the telecommunications device operated by the user, the configuration operation comprising:
processing a telephone calling card identification number received from the telecommunications device; and
receiving a user selection representing a specific number of digits to be entered in order to initiate redialing of a corresponding previously dialed telephone number, wherein the specific number of digits is limited to some number of the last digits of the corresponding previously dialed telephone number, whereby a user-defined calling card redialing function is configured for the calling card identification number; and
performing a redialing operation during a second network connection between the communication processing system and the telecommunications device operated by the user, the second network connection being subsequent to the first network connection, the redialing operation comprising:
processing the telephone calling card identification number received from the telecommunications device;
enabling the user-defined calling card redialing function using the identification number;
receiving, from the telecommunications device, one or more user-input digits; and
responsive to receiving one or more user-input digits equal to the specific number of digits, executing the at least one user-defined calling card function, wherein executing the at least one user-defined calling card function comprises:
performing a number lookup to determine which one of a plurality of previously dialed numbers corresponds to the one or more user-input digits; and
automatically redialing the one corresponding previously dialed number without requiring user input of all digits of the one corresponding previously dialed number.

8. The communication processing system of claim 7, wherein the command comprises user input of less than all digits of the number to be redialed.

9. The communication processing system of claim 7, wherein the at least one user-defined calling card function further comprises a name lookup function, and the operation further comprises:
receiving another command configured to invoke the lookup function, the command comprising a user name; and
in response to receiving the other command, accessing a directory containing a plurality of telephone numbers and a respective name for each of the plurality of telephone numbers in order to identify a number corresponding to the user name; and
after identifying the number corresponding to the user name, causing the number to be dialed.

10. The communication processing system of claim 7, wherein performing the number lookup to determine the one previously dialed number is prompted by an expiration of a predefined delay period initiated after receiving a last digit of the user-input digits.

11. The communication processing system of claim 10, wherein the predefined delay period is associated with the telephone calling card and is defined by the user of the telephone calling card.

12. The communication processing system of claim 7, wherein redialing one of the plurality of previously dialed numbers stored in the dialed numbers data structure comprises:
receiving, from the telecommunications device, a command containing a user-input number N; and
dialing an Nth previously dialed number stored in the dialed numbers data structure.

* * * * *